Patented July 14, 1953

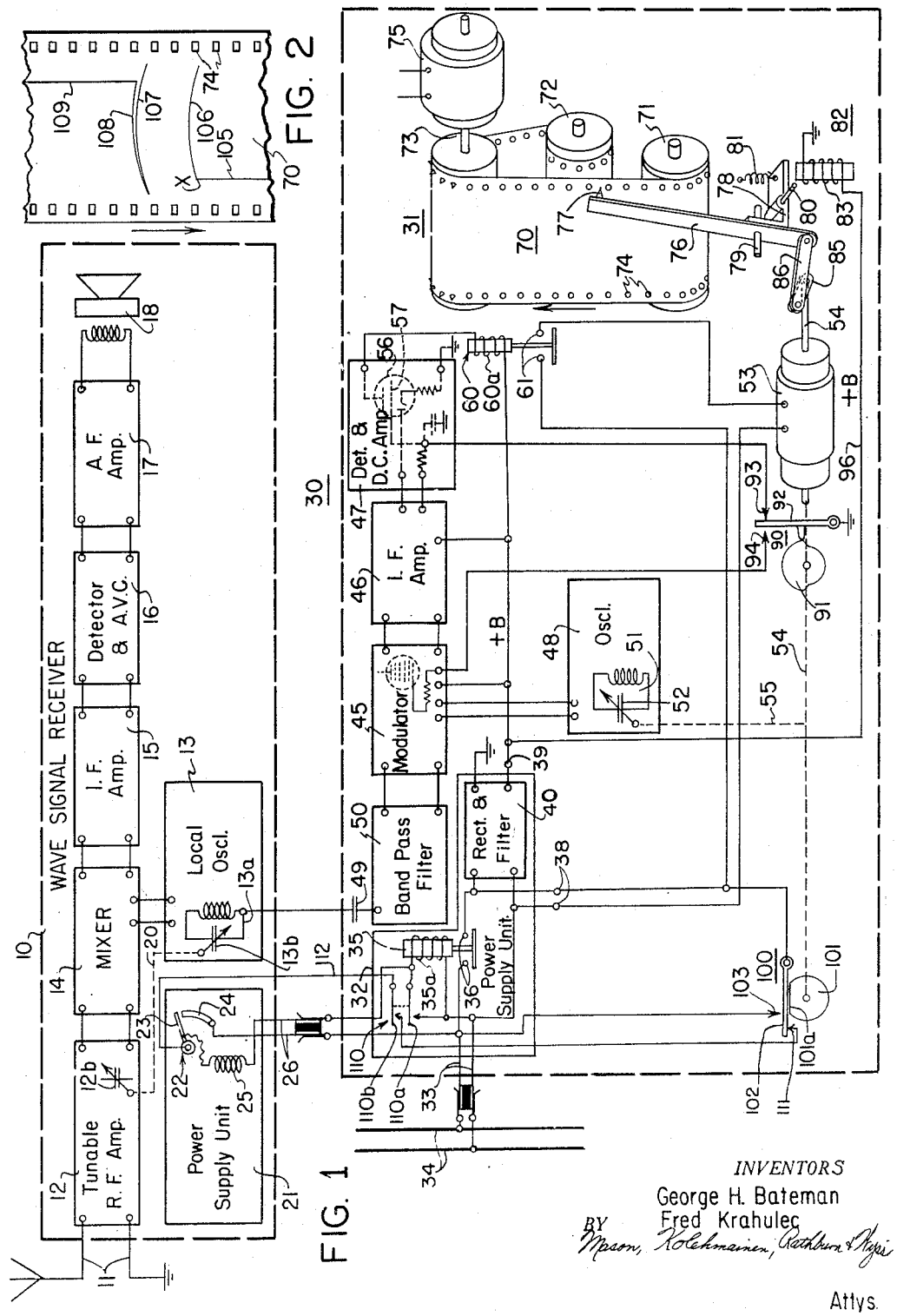

2,645,549

UNITED STATES PATENT OFFICE 2,645,549

DEVICE FOR RECORDING THE LISTENING HABITS OF WAVE SIGNAL RECEIVER USERS

George H. Bateman, Chicago, and Fred Krahulec, Skokie, Ill., assignors to A. C. Nielsen Company, Chicago, Ill., a corporation of Illinois Application June 18, 1948, Serial No. 33,798

10 Claims. (Cl. 346—37)

The present invention relates to a device or apparatus for recording the listening habits of wave signal receiver users (or viewing habits in the case of television) and more particularly is concerned with improved means for more positively indicating proper operation of the recording apparatus so that improper operation is readily detectable upon a cursory examination of the record obtained thereby.

Instrumented methods of determining the extent of use of wave signal receivers and particularly home radio receivers has been found to be the only satisfactory way of obtaining accurate information with regard to the listening or viewing habits of such wave signal receiver users. Such instrumented methods generally involve the use of a recording device operating in conjunction with one or more receivers in a particular collaborator's home. In certain situations it is desirable to use a recording device common to a plurality of homes used in the sampling system to record the extent of use of the receiver or receivers and to record as a function of time the particular channels to which the receiver or receivers are tuned for program reception. One device which has been commonly employed heretofore comprises facilities for driving in a predetermined manner with respect to time, such for example as at constant speed, a record tape or recording element together with translating means for variably positioning a recording stylus relative to the recording element in accordance with the tuning condition of the receivers. From the record on the recording element it is possible to determine the particular stations to which one or more receivers were tuned and also the length of time that the receiver or receivers were tuned to various channels. The transverse position of the stylus relative to the recording element or tape is indicative of the particular channel to which the receiver is tuned. If the recording element is moved at constant speed and the starting time when the recording element is put into operation is known each following point therealong is representative of a later chronological instant so long as the recording element continues to be driven at a constant speed.

It will be understood that in obtaining a sample of the listening habits of wave signal receiver users, several hundred broadcast receivers located in homes within the radiation areas of different sets of wave signal transmitters broadcasting the particular programs of interest are employed to provide the record information concerning the listening habits of the receiver users necessary to a statistical analysis from which the various factors affecting the sales effectiveness of the particular radio programs may be arrived at. In using the system it is contemplated that the collaborator homes—that is the homes in which wave signal use is to be logged—shall be on a basis such that all of the variable factors, such for example as the number of potential listeners, economic affluence, religion, etc., which normally affect any process of sampling public opinion, are accounted for on a weighted basis.

The record produced by any apparatus or device of the tuning condition of the associated wave signal receiver or receivers is usually taken over a predetermined calendar period such, for example, as a week, several weeks, or a month. If for any reason a defect occurs in the mechanism or a power outage occurs or the like, it is essential that this information be made available so that the particular recording element involved may be thrown out of the sample or at least the portion thereof affected thereby may be thrown out. It is essential for example to know whether a power outage has been involved which may have prevented energization of the stylus motor. If a characteristic mark were produced by the stylus each time the receiver were turned on or off or each time the tuning condition was changed, then an indication would be provided which would enable the analysis organization to determine by a cursory examination whether the recording element contains a record which is unsatisfactory or incorrect so as to require throwing the record away.

Accordingly it is an object of the present invention to provide simple means whereby the record produced by a device recording the tuning conditions of wave signal receivers with respect to time may more readily be analyzed from the standpoint of whether power outages occurred and also whether the operating mechanism was defective.

It is another object of the present invention to provide means for positively causing the stylus of the recording device for recording the tuning condition of wave signal receivers to move to the same predetermined position relative to the recording element in response to turning off the associated receiver, which position is different from any position assumed when indicating a tuning condition of the associated receiver.

A further object of the present invention is to provide in an apparatus for recording the tuning conditions of wave signal receivers, an arrangement which will insure the production of the same characteristic trace on the recording element each time the wave signal receiver is turned on.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawing in which:

Fig. 1 is a schematic diagram of apparatus embodying the present invention for recording the tuning condition of one or more wave signal receivers, and Fig. 2 is an enlarged view of a portion of the recording element or record tape to indicate a typical record produced thereon.

Although the present invention is applicable to apparatus for recording the tuning condition of receivers used in multiple receiver homes, for the purpose of illustrating the present invention, only a single receiver is disclosed. Referring now to the drawing there is illustrated a wave signal receiver 10 which is specifically illustrated as a superheterodyne type of wave signal receiver. It will be understood by those skilled in the art that a superheterodyne receiver comprises a local oscillator which produces a signal varying in frequency depending upon the particular radio station to which the receiver employing such local oscillator happens to be tuned. It is apparent therefore that the frequency of the output signal of the local oscillator provides an indication of the tuning condition of the receiver.

The particular construction of the wave signal receiver 10 is of no interest as far as the present invention is concerned other than the fact that it includes a local oscillator. As illustrated the wave signal receiver 10 comprises an antenna ground circuit 11, a radio frequency selector and amplifier unit or stage 12, a local oscillator 13, a mixer or converter stage 14 which may also be termed the first detector stage, an intermediate frequency amplifier stage 15, a detector and automatic volume control stage 16, an audio frequency amplifier stage 17, and a signal reproducer or loud speaker stage 18. Except for the local oscillator 13 the various stages are connected in tandem in the order named above. The local oscillator 13 is connected to the mixer stage 14 wherein the high frequency signal produced by the oscillator and the radio frequency signal received by the antenna ground circuit 11 are mixed to produce a particular frequency which is constant regardless of the channel to which the receiver is tuned. As illustrated in the drawings the local oscillator 13 incluudes a tuned circuit 13a including a variable reactance device. Also as illustrated the variable reactance device comprises a variable condenser 13b which is arranged to be gang operated with a condenser 12b of the radio frequency stage 12, the interconnection being schematically indicated by the dashed line 20. It will be understood that the tuning of the wave signal receiver 10 to a particular channel involves varying the capacitance of the condensers 12a and 13b and consequently varying the frequency of the local oscillator 13. For the standard broadcast band the frequency of the signal produced by the local oscillator 13 of conventional receivers usually varies over a range of 1,000 to 2,000 kilocycles. The wave signal receiver 10 is also illustrated as comprising a power supply unit 21 including the conventional control switch 22 comprising relatively movable contacts 23 and 24. The control switch 22 is conventionally also the manual volume control means. As illustrated the control switch 22 controls the electrical energy supplied to a winding 25 through a power cord 26, which winding 25 may, for example, comprise the primary winding of a suitable transformer which supplies a suitable rectifier unit and the like. It will be understood that when the control switch 22 is closed or in other words when the receiver is turned on and the power cord 26 is connected to a source of electrical energy that current will flow through the winding 25.

For purposes of indicating or recording the tuning condition of the wave signal receiver 10 and any other wave signal receiver which may be disposed in the same home as the receiver 10, there is provided an apparatus generally designated at 30 and including as a portion thereof a recorder unit generally designated at 31. As illustrated the apparatus 30 comprises a power supply unit generally designated at 32 which is adapted to be energized when the wave signal receiver 10 is turned on. As illustrated the power supply unit comprises a power cord 33 connected to a suitable source of alternating current potential generally designated at 34 which may comprise the conventional house wiring circuit. The power cord 26 of the wave signal receiver 10 is connected to the power supply unit 32 in a manner to include the winding 35a of a relay 35 having normally open contacts 36. When the wave signal receiver 10 is turned on by manipulating the switch 22 the current flow through the winding 35a causes the relay 35 to close its normally open contacts 36 so as to provide an alternating potential at the terminals 38 of the power supply unit 36 and a +B potential at the terminal 39 of the power supply unit 32. A suitable rectifier and filter unit 40 is included in the power supply unit 32 whereby the +B potential may readily be obtained from the alternating current source. It will be understood that the power supply unit 32 also serves as a source of filament current for any electron discharge valves employed in the apparatus 30 to be described in detail hereinafter. From the above description of the power supply unit 32 it will be apparent that whenever the receiver 10 is turned on, the actuation of the switch 22 causes relay 35 to close its normally open contacts 36 so as to provide a direct current potential at the terminal 39 and an alternating current potential at terminals 38.

The apparatus 30 is capable of converting the signal output of the local oscillator 13 which as has been mentioned above is indicative of the tuning condition of the wave signal receiver 10 to a recordable indication of such tuning. To this end the apparatus 30 includes a superheterodyne receiver comprising a mixer or modulator unit 45, an intermediate frequency amplifier unit 46, a detector and direct current amplifier unit 47 and an oscillator 48. A signal having a frequency equal to that of the output of the local oscillator 13 is supplied to the modulator unit 45 through a suitable coupling capacitor 49 and a band pass filter 50, the band pass filter being designed to attenuate all frequencies except those within the range of the output of the local oscillator 13. The oscillator 48 connected to the modulator 45 comprises a tuned circuit 51 including a resonant frequency varying device specifically illustrated as a variable capacitor 52. Preferably the variable capacitor 52 is actuated so as to vary the resonant frequency of the tuned circuit 51 over a predetermined range during each unit of time as for example once per minute. To this end a suitable synchronous motor 53 is provided drivingly connnected as by means of shafts generally designated at 54 and 55 to the rotor plates of the capacitor 52 whereupon the frequency of the signal output of the oscillator 48 is caused to vary over a predetermined range in a cyclic manner such as once per minute. The modulator 45, which also receives the signal from the local oscillator 13, therefore produces a beat frequency signal equal to the difference in frequency between the signal outputs of the oscillators 13 and 48. When this beat frequency signal has a predetermined value it is capable of being passed and amplified by the intermediate frequency amplifier 46 and detected by the detector associated with the detector and direct current amplifier unit 47.

As illustrated the detector and direct current amplifier unit 47 comprises an electron discharge valve 56 in the form of a diode triode with the diode portion functioning as a detector and the triode portion functioning as a direct current amplifier. The plate circuit of the triode portion of the electron discharge valve 56 is arranged to control the energization of a relay 60 having a winding 60a, one end of the winding 60a being connected to a source of +B potential as illustrated. The relay 60 is illustrated as comprising a set of contacts 61 which are normally closed when the wave signal receiver 10 is turned on and no signal is detected by the detector portion of the unit 47. When a signal is detected by the detector portion of the unit 47 a sufficient negative bias is effectively produced on the control electrode 57 of the electron discharge valve 56 (the potential of the control electrode remains constant but the potential of the cathode becomes more positive which is equivalent to causing the potential of the control electrode 57 to become more negative) so as to decrease the plate current sufficiently to deenergize the relay 60, with the resultant opening of the contacts 61 when a signal is detected by the detector portion of the unit 47. When the source of +B potential is rendered ineffective, as, for example, by opening the contacts 36 of the relay 35, the relay 60 is also deenergized.

From the above description it will be apparent that when the frequency of the output signal of the oscillator 48 has a value such that when combined in the modulator 45 with the signal output of the oscillator 13 a beat signal of a predetermined frequency is produced which is capable of being passed by the intermediate frequency amplifier 46 and detected by the detector portion of the unit 47, that the relay 60 is deenergized to deenergize the motor 53 and consequently stop the variation in capacitance of the capacitor 52. With this arrangement the capacitor 52 will be operated until it assumes a position whereby a predetermined resonant frequency of the tuned circuit 51 is produced which is indicative of the tuning condition of the wave signal receiver 10. Whenever the tuning of the wave signal receiver 10 is changed the signal detected at the detector portion of the unit 47 will disappear and the relay 60 will again be energized to close its contacts 61 whereupon the motor 53 will begin to rotate and the rotor of the variable condenser 52 will also rotate to change the capacitance thereof and consequently the resonant frequency of the tuned circuit 51. The unit 30 is often designated as a hunter unit by virtue of the fact that the motor 53 causes the capacitor 52 to hunt a position representative of the tuning condition of the wave signal receiver 10.

In order to produce a record of the position of the rotor of the capacitor 52 and consequently a record of the tuning condition of the wave signal receiver 10, the recorder 31 is provided. This recorder comprises a movable record receiving element or record tape 70 which is adapted to be moved between a supply spool 71 and a take up spool 72 by means of a drive sprocket 73 having suitable teeth for engaging perforations such as 74 disposed along the edges of the recording element 70. A suitable means such for example as the synchronous motor 75 preferably moves the record receiving element at a constant speed or in some other predetermined manner with respect to time. Associated with the movable record receiving element 70 is a record producing means in the form of a movable arm 76 including a stylus 77 at one end thereof. The arm 76 is pivotally mounted to a support 78 about a pivot pin 79 so that the stylus 77 is capable of moving transversely of the record tape 70 to produce an arcuate trace. Preferably the stylus 77 is biased out of engagement with the record receiving element 70. As illustrated this is accomplished by mounting the support 78 on a pivot 80 and biasing the support 78 by means of a spring 81 in a counterclockwise direction as viewed in Fig. 1 of the drawing. The stylus 77 is caused to engage the record receiving element 70 by electromagnetic means. As illustrated a portion of the support 78 comprises the armature of an electromagnet generally designated at 82 comprising a winding 83. Upon energization of the winding 83 pivotal movement of the armature 78 occurs with the result that the stylus 77 is moved into engagement with the element 70 to produce a record trace thereon.

In order to relate the stylus 77 with the position of the rotor of the capacitor 52 so that the transverse position of the stylus 77 with respect to the record receiving element 70 is indicative of the tuning condition of the wave signal receiver 10, the shaft 54 of the electric motor 53 is connected to the end of the arm 76 remote from the stylus 77 by means of a crank 85 and a link 86, as is clearly shown in Fig. 1 of the drawing. Rotation of the motor 53 will therefore cause the stylus to swing back and forth across the record receiving element 70 and if in engagement therewith to produce an arcuate trace thereon which might be referred to as the hunt trace since it is only produced when the apparatus 30 is hunting for a position representative of the tuning condition of the wave signal receiver 10.

To avoid any discrepancy with reference to the position of the stylus transversely of the tape 70 with reference to a particular tuning condition of the wave signal receiver 10 it is desirable that a trace be produced only when the stylus moves in one direction with reference to the record receiving element 70. Consequently, when the stylus 77 moves from the position shown in Fig. 1 of the drawing at the right hand edge of the record receiving element 70 to the left hand edge of the record receiving element, which movement is arbitrarily designated as the retrace stroke or movement, it is desirable that stopping of the motor 53 through opening of the contacts 61 should not occur. In other words the motor 53 should be capable of being stopped only for movement of the stylus 77 in one direction which has been arbitrarily chosen as movement from the left hand edge of the tape 70 as viewed in Fig. 1 of the drawing, to the right hand edge. To accomplish this it is necessary to squelch the signal channel supplying the relay 60 during the so-called retrace period. This might be accomplished in several ways. To this end a suitable cam actuated switch is provided generally designated by the reference numeral 90. As illustrated a cam 91 driven by the motor 53 causes movement of a switching member 92. The switching member 92, during the retrace period, engages a contact 93 in a manner to ground the control electrode 57 of the triode section of the electron discharge valve 56 of the unit or stage 47, and consequently squelches the signal channel to prevent the energization of the relay 60 and consequently the deenergization of the motor 53 during the so-called retrace period. It may also be desirable to incapacitate the oscillator 43 during the retrace period as for example by opening the ground circuit of the modulator tube in the unit 45. To this end the switch member 92 during the retrace period may move out of engagement with a contact 94 which normally completes the ground circuit to the cathode of the modulator tube disposed in the modulator unit 45.

As illustrated the winding 83 of the electromagnet 82 is preferably connected to the source of +B potential by means of the conductor 96 so that whenever the contacts 36 of the relay 35 are closed indicating the receiver 10 is turned on, the winding 83 of the electromagnet 82 is energized and the stylus 77 moved into engagement with the record receiving element or record tape 70.

With the arrangement described thus far it is apparent that when the receiver 10 is turned off the relay 35 is deenergized to cut off the source of +B potential whereupon the relay 60 is deenergized to open its contacts 61. This would result in stopping of the motor 53 and consequently stopping of the stylus 77 at random positions relative to the recording element 70. If, for example, mechanical jamming of the stylus control mechanism occurred whereby the stylus could not move from some predetermined jammed position, the record tape would indicate that each time the receiver was turned on the wave signal receiver was tuned to the same station representative of the jammed position of the stylus mechanism. There would be no way of checking that actually the stylus was jammed and that the record obtained of the tuning condition was inaccurate. In accordance with the present invention means are provided whereby the recording of such incorrect data would immediately be evident to whoever read the tape, and furthermore would be evident upon a cursory examination of the record on the recording element. It would furthermore be desirable, in the event of a power outage, to provide a distinctive indication which would differ from the indication which occurs when the stylus moves away from the tape due to turning off the receiver. To this end and in accordance with the present invention there is provided a simple cam control switch generally designated at 100 and comprising a rotatable cam 101 driven from the shaft 54 of the motor 53. The cam 101 is adapted to control a switch member 102 engageable with a contact 103 at substantially all positions of the stylus 77 except one. Accordingly, the cam 101 is provided with a flat portion 101a which permits the switch member 102 to open the circuit with respect to the contact 103 whenever the stylus 77 is at substantially its extreme right hand position relative to the record receiving element 70, which is the position just preceding the retrace portion of the stylus stroke. The control switch 100 of the present invention is preferably connected across the contacts 36 of the relay 35 whereby the motor 53 can never stop following deenergization by virtue of opening of the contacts 36 except in the position shown in the drawing which might be referred to as the "homing" position of the stylus 77, which position is clear of any portions of the record receiving element 70 where tuning conditions of the wave signal receiver 10 are recorded.

The operation of the control switch 100 of the present invention can best be understood by reference to Fig. 2 of the drawing where an enlarged section of the record tape 70 is indicated. Suppose, for example, that the stylus 77 produces a record trace 105 as indicated in Fig. 2 of the drawing which is indicative of tuning of the wave signal receiver 10 to a predetermined signal channel. If at point X the receiver is turned off, deenergization of relay 35 occurs. However, the control switch 100 of the present invention may still be closed and will effectively maintain +B potential on the relay 60 and the stylus electromagnet 82 until the flat portion 101a of the cam 101 is effective to permit the switch member 102 to move away from the contact 103. Since, however, the signal detected by the detector portion of the unit 47 has disappeared due to turning off of the receiver the relay 60 becomes energized and the motor 53 rotates until the control switch 100 opens to produce the arcuate trace portion 106 on the record tape 70. If the receiver 10 is turned on at a later time, the stylus 77 will first move across the recording element 70 during the retrace cycle to produce the arcuate trace 107 and then will return to produce the arcuate trace 108 until the new position of the stylus indicative of the new tuning condition of the receiver 10 is obtained, whereupon the trace 109 indicative of the new tuning condition of the receiver 10 is produced. As long as the arcuate portions 106 and 107 appear at the beginning and end of the trace portions, evidence exists that proper operation of the recorder 31 has occurred and furthermore that the receiver 10 was turned off. In the event of a power outage no arcuate portions such as 106 and 107 are produced but there would merely be a space between the ends of the traces assuming that the receiver was not retuned during the power outage period. If the receiver was turned off during the power outage an arcuate trace portion would appear at the beginning of the next trace portion.

It will be understood that the apparatus 30 should be capable of being employed with wave signal receivers of various types in order to be generally applicable regardless of the dictates of the sample of the wave signal receiver users. Occasionally wave signal receivers with which the apparatus 30 must be employed draw insufficient current to operate a relay such as the relay 35. This is true of certain portable receivers and also certain combined alternating current-battery farm receivers and the like. Some receivers of the AC-DC type draw a large direct current component which may cause a relay such as the relay 35 to chatter. In such special cases it is desirable to dispense with the relay 35 and provide an alternative arrangement. Such an alternative arrangement is disclosed in Fig. 1 of the drawings which comprises a two-pole switch 110 and an additional contact 111 associated with the cam switch 100. When it is desired to use the relay 35 in the manner described above the double pole switch 110 is in the open position indicated. However, when unsatisfactory operation of the relay 35 is likely to result by virtue of the type of wave signal receiver 10 with which the apparatus 30 is associated, the double pole switch 110 is moved to the closed position. In the closed position one blade 110a of the double pole switch 110 completes a short circuit for the winding 35a of the relay 35 thereby rendering the relay 35 ineffective. The other blade 110b of the two-pole switch 110 completes a circuit from the contact 23 of the receiver switch 22 through a conductor 112, and the contact 111 of the cam switch 100 as well as the switch arm 102 to one terminal of the rectifier and filter unit 40. When the wave signal receiver 10 is turned on and the cam switch 100 is in the position shown, power is supplied to the rectifier and filter unit 40 through the switch contact 111 instead of through the contacts 36 of the relay 35. As soon as the cam 101 has rotated out of the indexing or homing position the circuit is opened at the contact 111 and closed at the contact 103 thereby supplying power to the rectifier and filter unit 40 through the latter. It is apparent therefore, that either arrangement, whether the switch 110 is closed or opened, may be employed without in any way affecting the operation of the cam switch 100 which functions to cause movement of the apparatus 30 to an indexing or homing position whenever the wave signal receiver 10 is turned off.

In view of the detailed description included above the operation of the apparatus of the present invention will be apparent to those skilled in the art and no further discussion thereof is included herewith. It will be apparent that turning off the receiver produces a trace, which may be referred to as a tail and since an arcuate trace extending off the record portion of the tape is produced, this may be referred to as a "tail-off." In accordance with the present invention positive means for such tail-off are provided in a very simple manner whereby the analysis organization examining the record tapes can readily tell by virtue of the occurrence of such tail-offs whether proper functioning of recorder 31 has occurred, which furthermore enables one to readily distinguish between turning off of the receiver and a power outage.

It will be apparent to those skilled in the art that the present invention is not limited to the particular embodiments shown and described, but that changes and modifications may be made without departing from the spirit and scope of the present invention. It is aimed in the appended claims to cover all such changes and modifications.

What is claimed as new and desired to be secured by Letters Patent of the United States is:

1. Apparatus for denoting the channels to which a wave signal receiver is selectively tuned, comprising a recorder including means for moving a record receiving element, means responsive to the tuning condition of said receiver for producing a record on said element comprising a movable stylus, a motor drivingly connected to said stylus, an energizing circuit for said motor, control means responsive to a predetermined condition of said receiver for rendering said energizing circuit effective, and means connected with said energizing circuit for maintaining said motor energized following deenergization thereof in response to operation of said control means to move said stylus to a predetermined position relative to said record receiving element thereby to indicate normal deenergization of said motor.

2. Apparatus for denoting the channels to which a wave signal receiver is selectively tuned, comprising a recorder including means for moving a record receiving element, means responsive to the tuning condition of said receiver for producing a record on said element comprising a member movable relative to said element, electrical means for moving said member, an energizing circuit for said electrical means, control means responsive to a predetermined condition of said receiver for rendering said energizing circuit effective, and means connected to said energizing circuit for maintaining said electrical means energized following deenergization thereof in response to operation of said control means to move said member to a predetermined position relative to said record receiving element thereby to indicate normal deenergization of said circuit.

3. In an apparatus for producing a continuous record of the channels to which a wave signal receiver is selectively tuned, a recorder including means for moving a record receiving element in a predetermined manner with respect to time, means responsive to the tuning condition of said receiver for producing a record on said element comprising a member movable relative to said element, electrical means for moving said member, an energizing circuit for said electrical means, control means responsive to a predetermined condition of said receiver for rendering said energizing circuit effective and means connected to said energizing circuit for maintaining said electrical means energized following deenergization thereof in response to operation of said control means to move said member to a predetermined position relative to said record receiving element thereby to indicate normal deenergization of said circuit.

4. In an apparatus for producing a continuous record of the channels to which a wave signal receiver is selectively tuned, a recorder including means for moving a record tape, means responsive to the tuning condition of said receiver for producing a record on said tape comprising a member movable transversely of said tape, electrical means for moving said member, an energizing circuit for said electrical means, control means responsive to a predetermined condition of said receiver for rendering said energizing circuit effective, and means connected to said energizing circuit for maintaining said electrical means energized following deenergization thereof in response to operation of said control means to move said member to a predetermined position relative to said tape thereby to indicate normal deenergization of said circuit.

5. Apparatus for denoting the channels to which a wave signal receiver is selectively tuned, comprising a recorder including means for moving a record receiving element, means for producing a record on said element comprising a movable stylus, a motor drivingly connected to said stylus, an energizing circuit for said motor, a first means for closing said energizing circuit in response to the turning on of said receiver, a second means responsive to the tuning condition of said receiver for opening said energizing circuit to stop the movement of said stylus when its position relative to said record receiving element corresponds to the channel to which said receiver is tuned, and means in circuit with said first means to prevent said first means from opening said energizing circuit following turning off of said receiver until said stylus has moved to a predetermined position relative to said record receiving element.

6. In an apparatus for producing a continuous record of the channels to which a wave signal receiver is selectively tuned, comprising a recorder including means for moving a recording tape, means for producing a record on said tape comprising a stylus movable transversely of said tape, a motor drivingly connected to said stylus, an energizing circuit for said motor, a first means for closing said energizing circuit in response to the turning on of said receiver, a second means responsive to the tuning condition of said receiver for opening said energizing circuit to stop the movement of said stylus when its transverse position relative to said tape corresponds to the channel to which said receiver is tuned, and means in circuit with said first means to prevent said first means from opening said energizing circuit following turning off of said receiver until said stylus has moved to a predetermined position relative to said tape which is different from any position indicative of a channel to which said receiver may be tuned.

7. Apparatus for denoting the channels to which a wave signal receiver is selectively tuned, comprising a recorder including means for moving a record receiving element, means for producing a record on said element comprising a movable stylus, a motor drivingly connected to said stylus, an energizing circuit for said motor, a first means for closing said energizing circuit in response to the turning on of said receiver; a second means responsive to the tuning condition of said receiver for opening said energized circuit to stop the movement of said stylus when its position relative to said record receiving element corresponds to the channel to which said receiver is tuned, and a cam operated switch associated with said energizing circuit for rendering said first means ineffective to control said motor except when said stylus has moved to a predetermined position relative to said record receiving element.

8. In an apparatus for producing an indication of the channels to which a wave signal receiver is selectively tuned, comprising indicating means associated with said receiver for indicating the tuning condition of said receiver, means responsive to the current flowing through the "on"-"off" switch of said receiver for rendering said indicating means effective, electrical means for causing said indicating means to assume a predetermined reference or indexing position when said receiver switch is moved to its off position which indexing position is different from the position assumed due to a power failure of the electrical source supplying said electrical means, and means for maintaining said electrical means effective to cause said indicating means to assume said indexing position following opening of said "on"-"off" switch to deenergize said receiver.

9. In an apparatus for producing an indication of the channels to which a wave signal receiver is selectively tuned, comprising indicating means associated with said receiver for indicating the tuning condition of said receiver, means responsive to the current flowing through the "on"-"off" switch of said receiver for rendering said indicating means effective, electrical means for causing said indicating means to assume a predetermined reference or indexing position when said receiver switch is in its off position, and means for maintaining said electrical means effective to cause said indicating means to assume said indexing position immediately following opening of said "on"-"off" switch to deenergize said receiver, said electrical means being deenergized when said indicating means reaches its indexing position.

10. In an apparatus for producing an indication of the channels to which a wave signal receiver is selectively tuned, comprising indicating means associated with said receiver for indicating the tuning condition of said receiver, means for connecting said indicating means to a source of electrical energy, means including the "on"-"off" switch of said receiver for connecting said receiver to said source through said indicating means, a separate conductor connected from one terminal of said "on"-"off" switch of said receiver to said indicating means, means including said separate conductor for rendering said indicating means effective in response to the actuation of said "on"-"off" switch to the on position, electrical means for causing said indicating means to assume a predetermined reference or indexing position when said receiver switch is moved to its off position, and means for maintaining said electrical means effective to cause said indicating means to assume said indexing position following opening of said "on"-"off" switch to deenergize said receiver.

GEORGE H. BATEMAN.
FRED KRAHULEC.

References Cited in the file of this patent
UNITED STATES PATENTS

| Number | Name | Date |
|---|---|---|
| 1,269,525 | Craighead | June 11, 1918 |
| 1,318,723 | Bradshaw | Oct. 14, 1919 |
| 1,961,170 | Robinson | June 5, 1934 |
| 2,032,558 | Finch | Mar. 3, 1936 |
| 2,175,937 | Elder et al. | Oct. 10, 1939 |
| 2,258,677 | Dresser | Oct. 14, 1941 |
| 2,259,790 | Auten | Oct. 21, 1941 |
| 2,305,834 | Woodruff | Dec. 22, 1942 |
| 2,364,603 | Coxon et al. | Dec. 12, 1944 |
| 2,385,641 | Peterson | Sept. 25, 1945 |
| 2,439,201 | Clark, Jr. | Apr. 6, 1948 |